UNITED STATES PATENT OFFICE.

WILLIAM E. FARRELL, OF PHILADELPHIA, PENNSYLVANIA.

IMPROVEMENT IN THE MANUFACTURE OF PAPER-PULP FROM SALT-WATER FIBROUS PLANTS.

Specification forming part of Letters Patent No. 199,427, dated January 22, 1878; application filed December 7, 1877.

*To all whom it may concern:*

Be it known that I, WILLIAM E. FARRELL, of the city and county of Philadelphia, State of Pennsylvania, have invented certain new and useful Improvements in the Manufacture of Paper-Pulp made from Salt-Water Fibrous Plants; and I do hereby declare the following to be a full, clear, and exact description of the same.

My invention relates to the extraction of the coloring matter and other deleterious foreign substances from salt hay (the botanical name of which is "*Spartina Juncia*") and from other similar salt-water fibrous plants by a preliminary boiling in clean fresh water, as a primary stage in the process of reducing the same to paper-pulp. The presence of this matter and these substances prevents the production of a clean, clear pulp. These salt-water fibrous plants usually grow on marshes near the sea, or on low lands which are subjected to the action of the salt-water tides.

Salt hay and other classes of salt fiber have long been used in the manufacture of low grades of paper, such as "hardware-paper," and similar cheap grades in which a dark or black color is unobjectionable.

In the effort to extract this deleterious coloring matter to make finer grades of paper it has, in my own and other mills, been boiled in lime, and many other alkalies in both open vessels and under pressure, but with the usual result of a very small yield of fiber, which has retained the gums, acids, and, more particularly, the large amount of dark-green or brown coloring matter contained in salt hay and other salt-water fibrous plants.

All processes or chemicals heretofore used, so far as known, seem only to "set," "fix," or act as as a mordant upon these plants, making their colors more permanent, and rendering them insoluble and incapable of being thoroughly washed away, at the same time rendering the fiber more or less harsh, brittle, short, and weak, which disadvantages totally unfit it to be used for fine grades of paper. In fact, all known processes nearly destroy all the fiber without removing the coloring matter and other deleterious substances contained in these salt plants.

I propose in my process to remove this objectionable coloring matter and other foreign substances that prevent the production of a clean, clear pulp which can be used alone or in combination with other fibers in the production of a finer grade of paper than the fiber made from salt hay and the other salt-water fibers have ever been used in before, and at a much reduced cost in time and chemicals, and a greatly increased percentage in the yield and quality of the fiber.

To enable others skilled in the art to use my invention, I will describe its operation.

I use any open or closed suitable vessel for a boiler, but prefer the rotary boiler commonly used in paper-mills, because, being closed in, it takes less time and steam to attain good results, and the turning over of the fibers in the "rotary" causes a thorough circulation of the hot water through all the fibers.

My process is as follows: I place the salt hay in the boiler, add sufficient clear fresh water to hold in suspension the coloring and other foreign and deleterious matter contained in the salt hay, apply steam and boil (if in a closed vessel) under a pressure which will vary in duration and amount according to the quality of paper-pulp desired. If a low grade of pulp is required, three hours boiling, under five pounds pressure, will be found sufficient; but for a finer grade a longer time and a higher pressure should be used, although the same results may be obtained in an open vessel if sufficient time be allowed. The effect on the salt hay by this boiling in clear water is to dissolve the gums, acids, and coloring matter and other foreign substances contained in and around the fibers of the salt hay, making them soluble, and they are then removed from the fibers, and are held in suspension in the hot water, which is thus rendered almost black. This water is then allowed to run away, carrying with it these objectionable substances, leaving the fibers in a state to be further acted on by the usual well-known processes used in reducing it to pulp, which may vary according to the quality of paper to be subsequently made.

I do not claim subsequent boiling in lime or the many alkalies, as they are well known. The above-described treatment I use as a preliminary stage, and as a part of the process of reducing the fiber to paper-pulp. It may easily be seen, however, that the salt hay or other salt plant which it is desired to so prepare to make fine paper of may be so treated at or near the spot where it is gathered, fresh from the meadows, or in marshes upon which it grows, and this will not be unadvisable, as it will very likely be thus more easily treated and with some better success than if first allowed to dry hard, retaining its coloring matter; or it may be so prepared at any place, and afterward shipped or sold to manufacturing establishments to be reduced to fine pulp. Therefore, while this is essentially a preliminary step to and a part of the process of reducing such plants to paper-pulp, I do not limit myself to its use in a continuous process, as a long time may, without injury, be allowed to elapse from the inception of the process of reduction by means of this treatment and the subsequent subjection of the fiber to the action of alkalies to produce the pulping; but What I do claim, and desire to secure by Letters Patent, is—

In the process of reducing the fibers of salt hay (the botanical name of which is *Spartina Juncia*) and other salt-water fibrous plants to paper-pulp, first removing the coloring matter and other intercellulose substances foreign to the pure color of the fiber therefrom by boiling the same in clear fresh water as a preliminary stage, and then subjecting the remaining fiber to a boiling in a caustic solution to complete the operation, substantially as described.

WILLIAM E. FARRELL.

Witnesses:
 CHARLES F. LINDE,
 ALBERT E. ZACHERLE.